United States Patent [19]

Okamoto

[11] Patent Number: 5,926,548
[45] Date of Patent: Jul. 20, 1999

[54] METHOD AND APPARATUS FOR IMPLEMENTING HIERARCHICAL ELECTRONIC CASH

[75] Inventor: Tatsuaki Okamoto, Yokosuka, Japan

[73] Assignee: Nippon Telegraph and Telephone Corporation, Tokyo, Japan

[21] Appl. No.: 08/859,214

[22] Filed: May 20, 1997

[30] Foreign Application Priority Data

May 29, 1996 [JP] Japan .................................. 8-135167

[51] Int. Cl.$^6$ .............................. H04L 9/00; H04L 9/30
[52] U.S. Cl. .................... 380/24; 380/9; 380/23; 380/25; 380/30; 380/49; 705/26; 705/30; 705/35; 705/39; 705/40; 705/44
[58] Field of Search .................. 705/1, 26, 30, 705/35, 39, 40, 41, 42, 43, 44; 380/9, 23, 24, 25, 29, 30, 49, 50, 59; 235/379, 380

[56] References Cited

U.S. PATENT DOCUMENTS

| | | | |
|---|---|---|---|
| 4,977,595 | 12/1990 | Ohta et al. | 380/24 |
| 5,224,162 | 6/1993 | Okamoto et al. | 380/24 |
| 5,511,121 | 4/1996 | Yacobi | 380/24 |
| 5,774,553 | 6/1998 | Rosen | 380/49 |
| 5,799,087 | 8/1998 | Rosen | 380/24 |
| 5,832,089 | 11/1998 | Kravitz et al. | 380/24 |

*Primary Examiner*—Bernarr E. Gregory
*Attorney, Agent, or Firm*—Pollock, Vande Sande & Amernick

[57] ABSTRACT

A user U generates a signature verification key $N_U$, a signature key $SS_U$ and a cipher key K, enciphers $(X,N_U)$ by a public key into $E_I(X,K,N_U)$ and sends the enciphered information to a bank together with user information U and the amount of money X. The bank registers the information U and $E_I$ in a user data base in correspondence with each other, then withdraws the amount of money X from a user's bank account and sends information $(X,E_I)$ to an electronic cash issuer together with a bank signature $S_B(X,E_I)$ for the information. The issuer deciphers the enciphered information $E_I$ by a secret key to obtain the information $(X,N_U)$, then registers the information $E_I$ and the key $N_U$ in an inspection data base in correspondence with each other, and enciphers the signature $S_I(X,N_U)$ attached to the key $N_U$ by the key K into $E_K(S_I)$, which is sent to the user via the bank. The user deciphers the information $E_K$ by the key K to obtain the issuer signature $S_I$ and sends to a shop, as electronic cash C, information containing the key $N_U$ and the issuer signature $S_I$. The shop verifies the validity of the issuer signature and the user signature and, if they are valid, approves payment in an amount y. The shop sends data H of communication with the user to the issuer for settlement of accounts, and the issuer makes a check to see if the key $N_U$ in the data H is registered in the inspection data base.

13 Claims, 8 Drawing Sheets

METHOD AND APPARATUS FOR IMPLEMENTING HIERARCHICAL ELECTRONIC CASH

BACKGROUND OF THE INVENTION

The present invention relates to a method and apparatus for implementing hierarchical electronic cash through utilization of a telecommunication system or readable/writable storage such as a smart card.

In recent years there has been popularized an electronic funds transfer employing a telecommunication system. In general, a certificate convertible into money, such as a draft or check, has a symbolic function of its own (which guarantees its possessor to the rights stated thereon). When handled in the telecommunication system, the certificate is digitized data, which could easily be copied for repeated arbitrary or unfair conversion into money. This problem arises as well in the implementation of electronic cash such as a prepaid card, because it could also be copied for repeated arbitrary or unfair conversion into money or purchase of merchandise. On the other hand, the credit card is essentially free from the danger of such double usage, but instead it has a disadvantage that the whole history of customer's use of the card becomes known to a credit card issuing company (that is, user privacy is not preserved). As a solution to these problems, there has been proposed a scheme that uses a card having a computation facility and devises the exchange of data between a card reader and the card for its conversion into money to thereby ensure user privacy and detects its double usage. This is disclosed in, for example, Chaum, Fiat and Naor, "Untraceable Electronic Cash," Proc. Of CRYPTO '88.

With the Chaum et al. scheme, however, it is necessary, for preserving security to some extent (the probability of success in overspending is $½^{30}$, for instance), that three procedures of inquiry, response and verification in the processing of user's payment of electronic cash to a shop be repeated by the number of times (30 times, for example) corresponding to the security intended to provide—this significantly increases the volume of communication required. Another problem is indivisibility of electronic cash.

The principle for divisional use of electronic cash proposed so far is based on mathematically ingenious logic that utilizes a hierarchial structure as disclosed in U.S. Pat. No. 5,242,162, for instance. However, the actual implementation of this conventional scheme involves many procedures and large computational loads.

The electronic cash implementing system is configured primarily on the assumption that the same financial institution both issues electronic cash and manages users' accounts, and consequently, the electronic cash issued by the financial institution returns thereto from the user via shops and banks. Hence, it is impossible to keep a watch on the amount of electronic cash issued and circulated in financial circles.

SUMMARY OF THE INVENTION

It is therefore an object of the present invention to provide an electronic cash implementing method which ensures user privacy and prevents abuses of electronic cash but permits reduction of the amount of communication involved in the payment of electronic cash and its divisional use and makes it possible to keep under surveillance the amount of electronic cash issued and circulated throughout the financial world.

Another object of the present invention is to provide an apparatus for implementing the above-mentioned electronic cash scheme.

According to the present invention, there is provided an electronic cash implementing method for an electronic cash system composed of an electronic cash issuer, a bank which manages a user's account, an electronic cash user, and a shop which receives payment by electronic cash, the method comprising:

step (1) wherein the electronic cash issuer opens an encipher function $E_1$ and a signature verification function $V_1$ to the public;

step (2) wherein the user sends to the bank user information U and a face value X for requesting the bank to withdraw an amount of money X from his bank account and issue electronic cash of the face value X, while at the same time the user generates verification key $N_U$ for his signature and a cipher key K, then enciphers the signature verification key $N_U$ and the cipher key K to generate enciphered user information $E_I(X,K,N_U)$, and sends it to the bank;

step (3) wherein the bank withdraws the amount of money X from the user's bank account, and sends information $\{X,E_I(X,K,N_U)\}$ as an electronic cash issuance request to the electronic cash issuer, while at the same time the bank records in a user data base the user name U and the enciphered user information $E_I(X,K,N_U)$ in correspondence with each other;

step (4) wherein the electronic cash issuer uses a decipher function $D_I$ to decipher the enciphered user information $E_I(X,K,N_U)$ to obtain information $(X,K,N_U)$, generates information $n=g(N_U)$ containing the signature verification key $N_U$, signs the information n and the amount of money X to create an issuer signature $S_I(X,n)$, then registers the information n and $E_I(X,K,N_U)$ in an inspection data base in correspondence with each other, and calculates an enciphered issuer signature $E_K(S_I(X,n))$ obtained by enciphering the issuer signature $S_I(X,n)$ by the cipher key K, and sends the enciphered issuer signature $E_K(S_I(X,n))$ to the user;

step (5) wherein the user deciphers the enciphered issuer signature $E_K(S_I(X,n))$ by the key K into the issuer signature $S_I(X,n)$;

step (6) wherein the user sends, as electronic cash C of the face value X, information containing $\{N_U,X,S_I(X,n)\}$ to the shop for the payment thereto in an amount y;

step (7) wherein the shop verifies the validity of the electronic cash C and, if valid, receives the payment in the amount y;

step (8) wherein the shop sends to the electronic cash issuer all communication data H concerning the payment by the electronic cash and requests the issuer to settle accounts with the shop; and step (9) wherein the electronic cash issuer obtains, with the signature verification key $N_U$ in the communication data H, the information $n=g(N_U)$ containing the key $N_U$, makes a check to see if the information n is already registered in the inspection data base, verifies the validity of the electronic cash and, if valid, instructs the bank to transfer the amount of payment y to a bank account of the shop.

The above method may be modified so that the electronic cash issuer generates and gives the user signature verification key $N_U$ to the user.

The user apparatus for the electronic cash implementing method according to the present invention comprises: means for generating a cipher key K; means for generating a signature generating key $SS_U$ and the signature verification key $N_U$; encipher means for enciphering the amount of money X and the keys K and $N_U$ to obtain the information $E_I(X,K,N_U)$; means for sending the user information U, the amount of money X and the information $E_I(X,K,N_U)$ to the bank; decipher means for deciphering enciphered information received via the bank from the electronic cash issuer to obtain the issuer signature $S_I(X,N_U)$; and signature generating means for attaching the user signature to information e received from the shop and the amount of payment y to generate a signature $S_U(e,y)$ and for sending the signature $S_U(e,y)$ to the shop.

The bank apparatus for the electronic cash implementing method according to the present invention comprises: a user data base for storing the enciphered information $E_I(X,K,N_U)$ and the user information U in correspondence with each other; means for sending, to the electronic cash issuer, information $S_B(X,E_I(X,K,N_U))$ obtained by attaching a bank signature to the information X and $E_I$, together with information X and $E_I(X,K,N_U)$; and means for retrieving from the inspection data base the user information U corresponding to the enciphered user information $E_I(X,K,N_U)$ sent from the electronic cash issuer.

The electronic cash issuer apparatus for the electronic cash implementing method according to the present invention comprises: decipher means for deciphering the enciphered information $E_I$ from the bank to obtain the user signature verification key $N_U$; an inspection data base for registering the user signature verification key $N_U$ and the enciphered information $E_I$ in correspondence with each other; signing means for attaching an issuer signature to information $(X,N_U)$ to obtain an issuer signature $S_I(X,N_U)$; means for enciphering and sending the issuer signature $S_I(X,N_U)$ to the user; means for retrieving the inspection data base for the registration of the signature verification key $N_U$ contained in the communication data H received from the shop; means for updating the total amount of money Y paid so far, held in the inspection data base in correspondence with the signature verification key $N_U$, with the amount of payment y to Y+y; and means which compares the updated total amount of money Y with the face value X of the electronic cash issued and, if X<Y, decides that the payment by the user is improper, then cancels the corresponding registration in the inspection data base and sends the corresponding enciphered information $E_I(X,K,N_U)$ to the bank.

The shop apparatus for the electronic cash implementing method according to the present invention comprises: means for verifying the issuer signature $S_I$ in the electronic cash C received from the user; means for generating and sending the arbitrary information e to the user; means for verifying the user signature $S_U$ received from the user; and means which, if either of the signatures is valid, receives payment of the amount y by electronic cash and sends the data H of communication with the user to the electronic cash issuer.

According to the present invention, the institution for issuing electronic cash (the electronic cash issuer) and the financial institution (bank) which manages the user's account are hierarchically separated. Through utilization of the public key cipher of the issuer in the processing for issuing therefrom electronic cash, there is no possibility that information peculiar to the user becomes known to the bank.

Further, the electronic cash issuer and the bank manage the user information independently of each other, and when an abuse of the electronic cash is found out, the pieces of information held by them are combined to specify the abuser.

On the other hand, the use of the signature key of the user in the processing for his payment permits divisional use of electronic cash. That is, the user signature to the amount of payment could be presented as evidence of an abuse or overspending if the user pays more than a predetermined amount of money.

DESCRIPTION OF THE PREFERRED EMBODIMENTS

Figure 1:
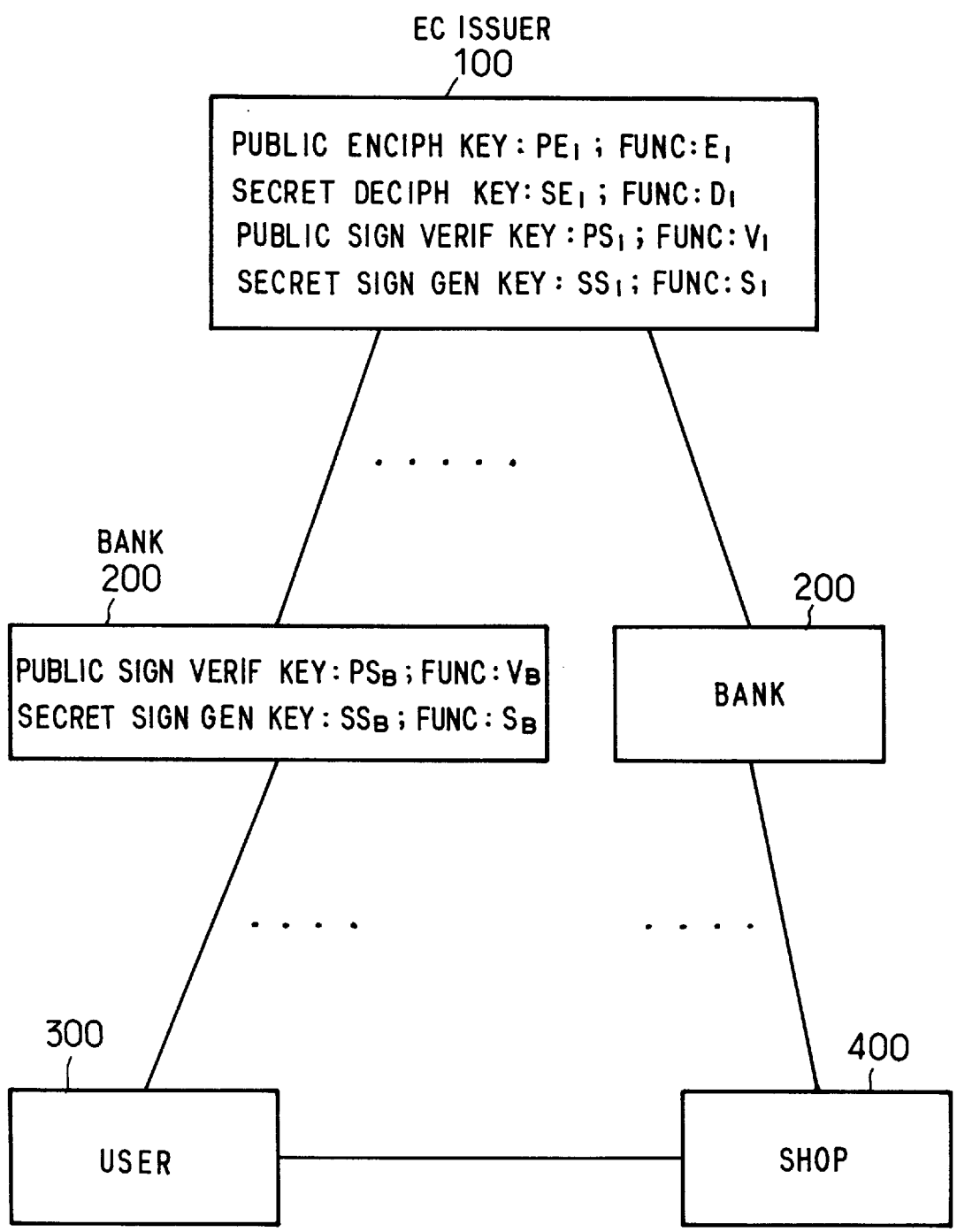
FIG. 1 is a block diagram schematically illustrating an example of the system configuration to which the method of the present invention is applied.

In FIG. 1 there is schematically shown an example of the system configuration to which the method of the present invention is applied. In the system there are interconnected via communication lines or the like an apparatus of an electronic cash issuing institution (hereinafter referred to simply as an issuer) 100, an apparatus of an institution which manages user information (account information) (hereinafter referred to simply as a bank) 200, an apparatus of a person who has electronic cash issued (hereinafter referred to simply as a user) 300 and an apparatus of an institution which receives electronic cash from the user (hereinafter referred to simply as a shop) 400. These apparatus may also be interconnected via a smart card or the like.

According to the present invention, when the user 300 requests the bank 200 to perform a procedure for issuing electronic cash of the face value X, the bank 200 withdraws the amount of money X from the bank account of the user 300 and sends to the issuer 100 the user's request together with a digital signature of the bank 200 indicating that the request is valid. The issuer 100 verifies the validity of the request for issuance of electronic cash and issues electronic cash of the face value X to the user 300.

In this instance, the user 300 generates, as electronic cash issuance requesting information, information containing a signature verification key $N_U$ that would be needed by a shop 400 to verify the user signature in the procedure for the user to pay electronic cash to the shop 400. If the signature verification key $N_U$ is contained in an exposed form in the issuance request information, the bank 200 can easily find out the verification key $N_U$ of the user 300 requesting the issuance of electronic cash. Consequently, if the bank 200 conspires with shops, the bank can get information on the user (user information U) who paid electronic cash to the shop, and hence the bank can get to know how much electronic cash the user spent at which shop; that is, user privacy cannot be provided.

To ensure user privacy, in this embodiment the user 300 enciphers the information containing the signature verification key $N_U$ by using a public encipher key K of the issuer 100 and sends the enciphered information to the bank 200 to request it to carry out the procedure for the issuance of electronic cash. The bank 200 stores the enciphered request information $E_I(X,K,N_U)$ in a data base in correspondence with the user name U, while at the same time it sends the request information to the user 100 together with the bank signature. This embodiment will be described below in detail.

While this embodiment will be described on the assumption that $n=(x,N_U)$, it is also possible, in general, to use an arbitrary identity function g to transform $(x,N_U)$ to $n=g(x,N_U)$ and use n as a value (information) corresponding to $(x,N_U)$. In this embodiment, g is considered as an identity function and information $E_I(X,K,N_U)$ may be considered as a combination of $E_I(X,K)$ and $E_I(N_U)$.

(1) Processing for Issuance of Electronic Cash

Figure 2:
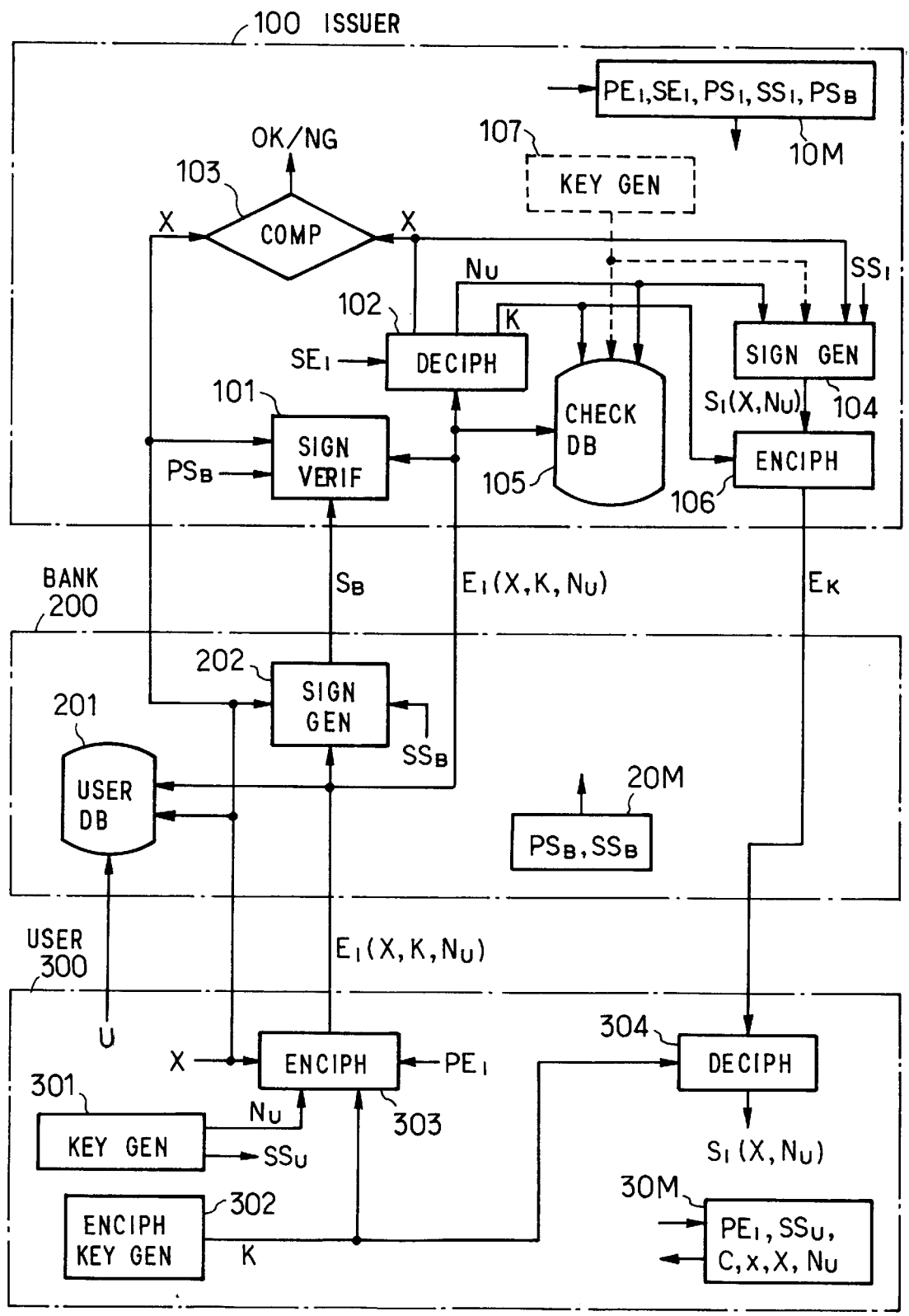
FIG. 2 is a block diagram illustrating a functional configuration in the processing for the issuance of electronic cash according to the method of the present invention.

A description will be given first, with reference to FIG. 2, of how the user has a bank issue electronic cash.

Let it be assumed that the issuer 100 and the bank 200 generate in advance and store public and secret keys for a public key cryptosystem and a digital signature system (see, for example, Bruce Schnier, "Applied Cryptography," John Wiley, 1994). The issuer 100 makes public a public key $PE_I$ for public key cryptography and a public key $PS_I$ for digital signature verification use. In the following an encipher function $E_{PEI}$ using the public key $PE_I$ of the issuer 100 will be described as $E_I$. To make the public key $PE_I$ public is predicated on the fact that the encipher function $E_I$ using it is also made public. Similarly, to make public the public key $PS_I$ for issuer digital signature verification use is predicated on the fact that a signature verification function $V_I=V_{PSI}$ using the public key $PS_I$ is also made public. The bank 200 also makes public the public key $PS_B$ for digital signature verification use and a signature verification function $V_B=V_{PSB}$ using it.

Incidentally, the issuer 100 secretly holds in a memory 10M a secret key $SE_I$ corresponding to a decipher function $D_I=D_{SEI}$, and the public key $PE_I$ to be used with the encipher function $E_I$; that is, the key $SE_I$ is held in secrecy. Further, the issuer 100 secretly holds in the memory 10M a secret key $SS_I$ to be used with a signature generating function $S_I=S_{SSI}$ and a public key $PS_I$ to be used with the signature verification function $V_I$ for signature verification; that is, the key $SS_I$ is held in secrecy. Likewise, the bank 200 secretly holds in a memory 20M a secret key $SS_B$ to be used with a signature generating function $S_B=S_{SSB}$ and the public key $PS_B$ to be used with the signature verification function $V_B$.

To make a request for the issuance of electronic cash of a face value X, the user 300 carries out the following steps to request the bank 200 to draw out the amount of money X from his bank account.

Step 1: The user 300 generates a signature generating key $SS_U$, a signature generating function $S_U$ and a signature verification key $N_U$ in a digital signature key generating section 301. Further, the user 300 generates a cipher key K in a cipher key generating section 302 for a secret key cryptosystem (see, for example, Bruce Schnier, "Applied Cryptography," John Wiley, 1994). Next, the user 300 uses the opened cipher function $E_I$ and the encipher key $PE_I$ of the issuer 100 to encipher information $(X,K,N_U)$ in encipher section 303 into an electronic cash issuance request $E_I(X, K,N_U)$ and sends it to the bank 200 together with a message requesting it to withdraw the amount of money X from the bank account of the user 300. The cipher key K is one that the issuer 100 uses to encipher a response $S_I(X,N_U)$ to the user 300 described later on. It is desirable that this message be authenticated by a digital signature of the user 300, for instance.

Step 2: The bank 200 checks the balance in the bank account of the user 300, then subtracts the amount X from the balance, and records the user name U and the request $E_I(X, K,N_U)$ in a pair in a user data base 201. The withdrawal request message of the user 300 may also be recorded. The request message, if signed, in particular, will possess the probative value of evidence. The withdrawal from the user's bank account may be made anytime after checking the balance.

Next, the bank 200 calculates its digital signature $S_B=S_B(X,E_I(X,K,N_U))$ for X and $E_I(X.K,N_U)$ in a signature generating section 202 and sends the information $\{X,E_I(X, K,N_U)S_B\}$ to the user 100.

Step 3: The issuer 100 verifies the validity of the signature $S_B$ from the bank 200 by the signature verification function $V_B$ in a signature verification section 101 using the signature verification key $PS_B$. If the signature $S_B$ is valid, then the issuer 100 deciphers the enciphered information $E_I(X,K,N_U)$ by using the secret key $SE_I$ in a decipher section 102 to obtain the information X, K and $N_U$. After this, the issuer 100 compares the information X sent from the bank 200 and the deciphered information X in a compare section 103 to see if they are identical. If so, the issuer 100 creates, in a signature generating section 104, a signature $S_I(X,N_U)$ for the information $(X,N_U)$ containing the signature verification key $N_U$ of the user 300.

Moreover, the issuer 100 registers a triad of information $N_U$, $E_I(X,K,N_U)$ and K and information B on the bank 200 (its name or identification number) in an inspection data base 105 in correspondence with the initial value Y=0 of the total amount of money used Y.

Additionally, the issuer 100 enciphers the signature $S_I(X, N_U)$ by the encipher key K in an encipher section 106 to obtain enciphered information $E_K(S_I(X,N_U))$, which is sent to the bank 200.

Step 4: The bank 200 sends to the user 300 the enciphered information $E_K(S_I(X,N_U))$ sent from the issuer 100.

Step 5: The user 300 deciphers the enciphered information $E_K(S_I(X,N_U))$ by the key K in a decipher section 304 to obtain the signature $S_I(X,N_U)$ of the issuer 100.

Then, the user 300 stores in a memory 30M the initial value of the balance x of electronic cash set at x=X and the information $C=\{x,X,N_U,S_I(X,N_U)\}$ as electronic cash of the face value X, together with the information x, $N_U$ and $SS_U$. In the following description the electronic cash C will be called electronic cash issued by the issuer 100.

(2) Payment by Electronic Cash

Figure 3:
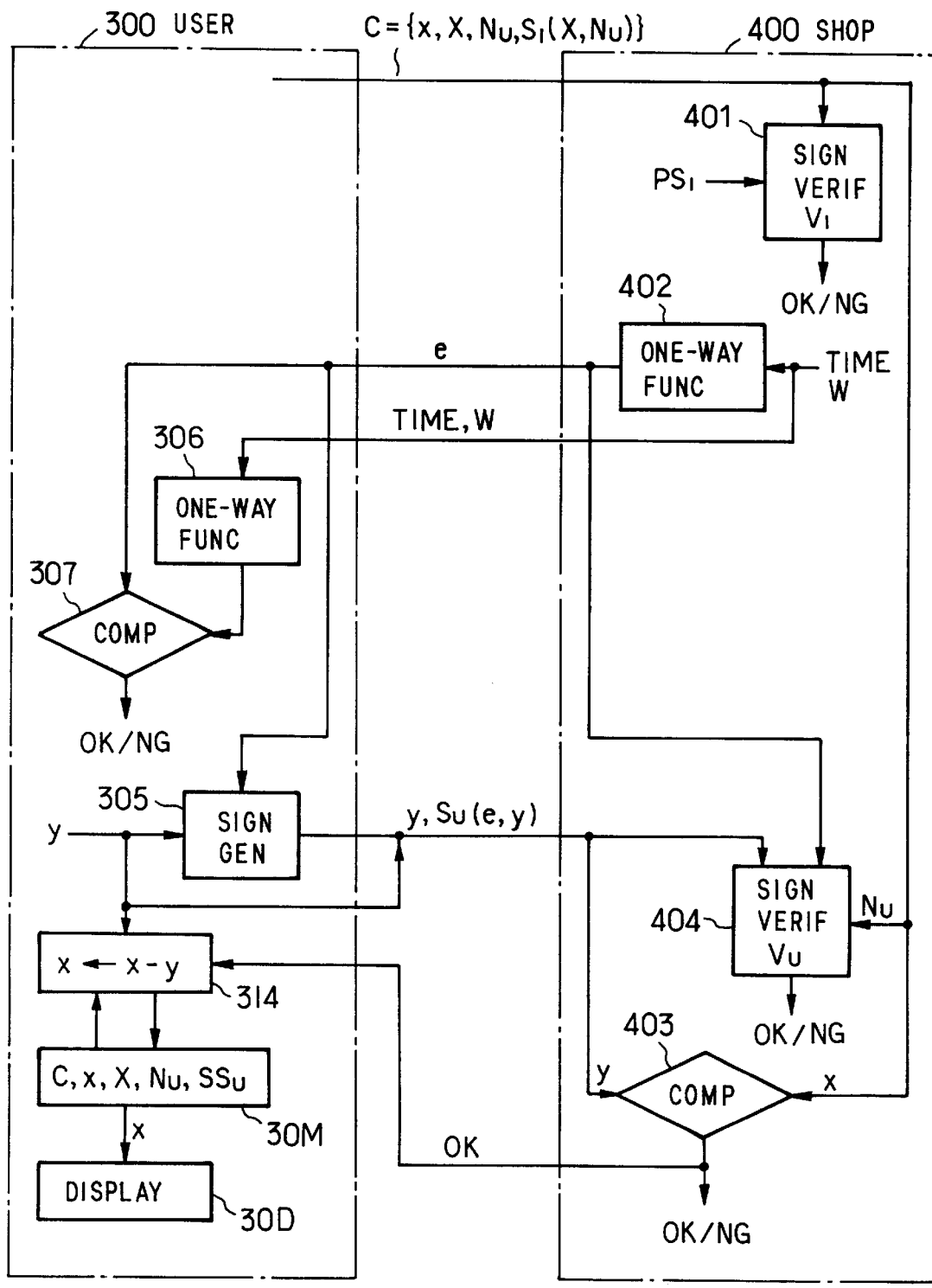
FIG. 3 is a block diagram illustrating a functional configuration in the processing for the payment by electronic cash according to the method of the present invention.

Next, a description will be given, with reference to FIG. 3, of how the user 300 pays the amount of money y (y≦x) to the shop 400 by the electronic cash C of the face value X and the balance x.

Step 1: The user 300 displays on a display section 30D the balance x read out of the memory 30M and makes sure that the balance x is more than the amount of money y to be paid, and then sends the electronic cash $C=\{x,X,N_U,S_I(X,N_U)\}$ to the shop 400.

Step 2: The shop 400 verifies the validity of the signature $S_I(X,N_U)$ of the electronic cash issuer 100 by the public key $PS_I$ for verification of the signature of the issuer 100 in a signature verification section (of a signature verification $V_I$) 401. If the issuer signature is valid, the shop 400 generates inquiry information e=f(TIME,W) for verification from information W corresponding to the shop 400 (such as its identifier $ID_W$ or signature verification key $N_W$) by a one-way function calculating section 402 using a one-way function f, and the shop 400 sends the information TIME, W and e to the user 300.

Step 3: The user 300 verifies the validity of the inquiry information e=f(TIME,W) by a one-way function calculating section 306 and a compare section 307. If it is valid, the user 300 calculates by a signature generating section 305 a user's signature $S_U(e,y)$ for the information e sent thereto and the payment y (y≦x) by the signature generating key $SS_U$ and sends the information y and $S_U(e,y)$ to the shop 400.

Step 4: The shop 400 verifies the validity of the user signature $S_U(e,y)$ by a signature verification section (of a signature verification function $V_U$) 404 using the signature verification key $N_U$ received from the user 300 and verifies y≦x by a compare section 403. If either of them is valid, the shop 400 approves the payment of the amount of money concerned y by electronic cash and sends a decision result OK to the user 300, but if at least one of them is invalid, the shop 400 sends a decision result NG declining the payment by electronic cash.

The shop 400 may verify the validity of the signature $S_I(X,N_U)$ of the issuer 100 after sending the information TIME, W and e to the user 300.

Step 5: When receiving the decision result OK from the shop 400, the user 300 updates, by a subtract section 314, the balance x in the memory 30M with x←x−y.

(3) Settlement of Accounts

Figure 4:
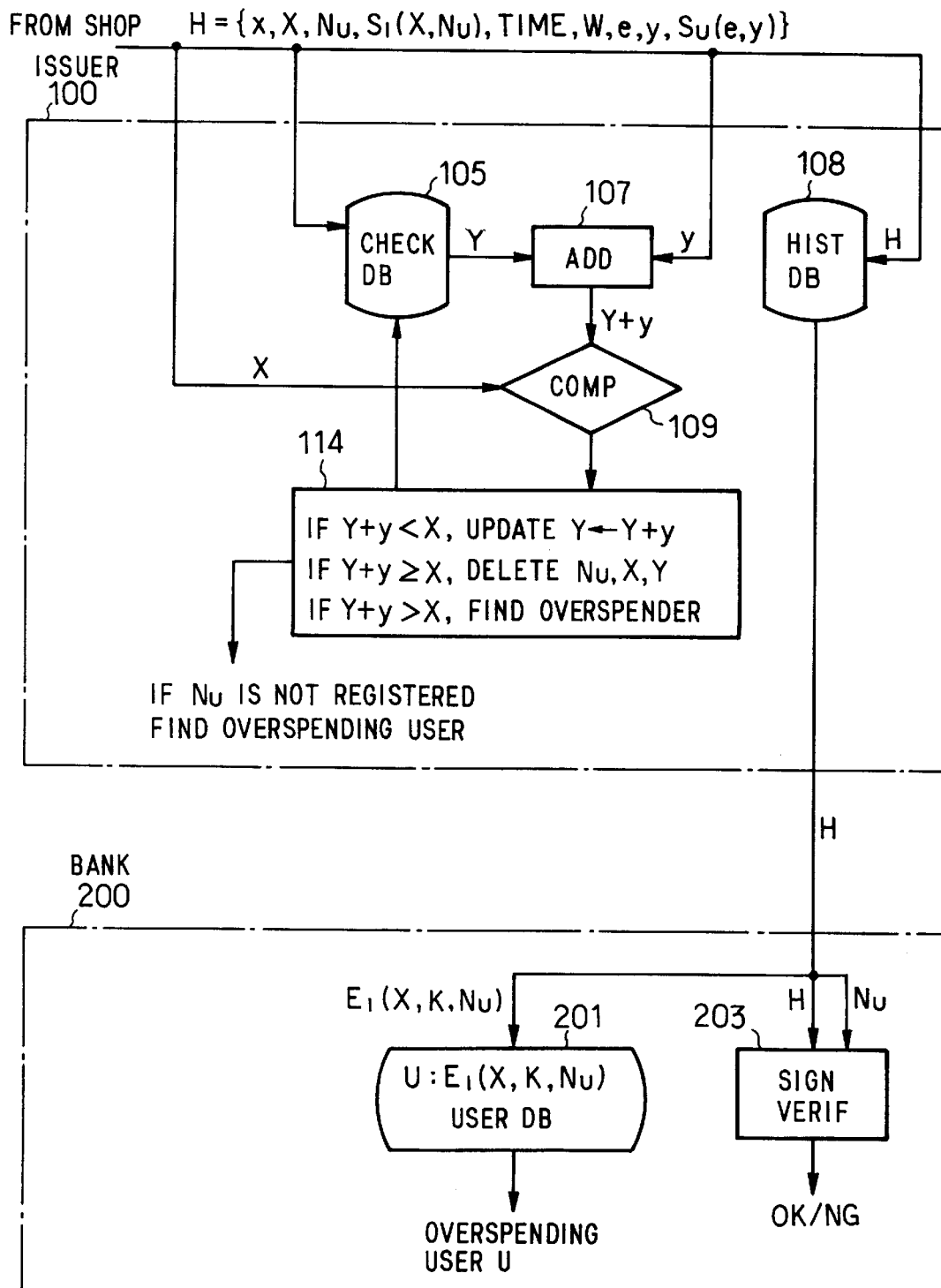
FIG. 4 is a block diagram illustrating a functional configuration in the processing for the settlement of electronic cash according to the method of the present invention.

Turning next to FIG. 4, a method for settlement of accounts between the shop 400 and the bank 200 will be described.

Step 1: In the first place, the shop 400 sends all communication data H={x,X,$N_U$,$S_I(X,N_U)$,TIME,W.e,y,$S_U(e,y)$} between it and the user 300 to the issuer 100.

Step 2: The issuer 100 makes a check to see if the pair $(X,N_U)$ of the signature verification key $N_U$ of the user 300 and the face value X contained in the communication data H is registered in the inspection data base 105. If it is registered, the issuer 100 updates, by an add section 107 and a compare section 103, the sum total Y of payments recorded corresponding to the information $(X,N_U)$ with Y+y→Y and makes a check again to see if the updated value Y is smaller than the face value X. Further, the issuer 100 records the communication data H in a history data base 108. It is preferable that the amount of data stored in the history data base 108 be reduced by setting a term to the storage of every data therein and eliminating therefrom the data when the term expires.

If the information $(X,N_U)$ is already registered in the inspection data base 105, the issuer 100 instructs the bank 200, which corresponds to the bank information B recorded in correspondence with the registered information $(X,N_U)$, to transfer the amount of money y to the bank account of the shop 400. In this case, the bank with which the shop 400 has its account need not be the same as the bank 200 with which the user 300 has its account.

If Y+y=X, the issuer 100 eliminates the information $(X,N_U)$ and the corresponding total sum of money used Y and bank information B from the inspection data base 105 because all the electronic cash was spent.

When the information $(X,N_U)$ is not registered in the inspection data base 105, the issuer 100 decides that the user 300 overspent, and it performs processing for specifying the overspender. If Y+y>X, the issuer 100 deletes the information $(X,N_U)$ and the corresponding total sum of money used Y and bank information B from the inspection data base 105. Also in this case, the issuer 100 decides that the user 300 overspent, and it carries out the overspender specifying processing.

Step 3: In the overspender specifying processing, prior to the elimination of the information $(X,N_U)$ from the inspection data base 105, the issuer 100 retrieves from the history data base 108 information (all communication data H concerning the overspending) that is used as evidence of overspending and sends the retrieved information to the bank 200 along with the information $(X,K,N_U)$ and $E_I(X,K,N_U)$ also retrieved from the inspection data base 105. The bank 200 verifies the validity of the evidence of overspending by a signature verification key $N_U$ in a signature verification section 203 and, if it is valid, specifies overspender information U by retrieving the user data base 201 by using the information $E_I(X,K,N_U)$ as a key.

In the above embodiment, when the same user is allowed to simultaneously have plural pieces of electronic cash of the same face value X, the user needs only to create an arbitrary variable, for example, time information TM and demand the issuance of electronic cash corresponding to information $(X,K,N_U,TM)$. Alternatively, if a different verification key $N_U$ is generated for each request for issuance of electronic cash, such variable as TM may not be used.

While in the above the user 300 has been described to create the signature verification key $N_U$, provision may be made to generate it by some other institution, for example, the issuer 100, so as to lighten the load of processing on the user. In such an instance, the user 300 sends information {U,X,$E_I(X,K)$} to the bank 200, and as in the case of receiving the enciphered electronic cash issuance request $E_I(X,K)$, the bank 200 registers the information $E_I(X,K)$ in the user data base 201 in correspondence with the user information U, while at the same time it signs the information {X,$E_I(X,K)$} in the signature generating section 202 to generate the information $S_B=S_B(X,E_I(X,K))$, which is sent to the issuer 100 together with the information {X,$E_I(X,K)$}. The issuer 100 also verifies the validity of the bank signature $S_B(X,E_I(X,K))$ in the signature verification section 101 and deciphers the information $E_I(X,K)$ into $(X,K)$, after which the issuer 100 generates the signature verification key $N_U$ in a broken-lined key generating section 107 (FIG. 2) and, as in the above, attaches its signature to the information $(X,N_U)$ to create the signed information $S_I(X,N_U)$, then enciphers it and the key $N_U$ to obtain $E_K(N_U,S_I(X,N_U))$, which is sent to the user 300 via the bank 200. In either case, it is also possible to employ a system configuration in which the issuer 100 transforms the key $N_U$ by an arbitrary function to obtain information n=g($N_U$) instead of obtaining the information $(X,N_U)$, then attaches its signature to (X,n) to obtain signed information $S_I(X,n)$, and enciphers it together with the key $N_U$, thereafter sending them to the user 300. In such an instance, the issuer 100 registers the information $E_I(X,K,N_U)$ or $E_I(X,K)$ in the inspection data base 105 in correspondence with the information n. The user uses the information {x,X,$N_U$,$S_I(X,n)$} as the electronic cash C. In the settlement of an account for the payment by the electronic cash C, the issuer 100 derives the information n=g($N_U$) from the signature verification key $N_U$ in the updated data H received from the shop 400 and makes a check to see if the information n is registered in the inspection data base 105.

According to the above-described electronic cash implementing method of the present invention, the issuer 100 issues all electronic cash in response to a request of each bank 200, and hence it can always keep track of the total amount of electronic cash in circulation.

Moreover, since what is required of the user 300 for the payment to the shop 400 by electronic cash is only to make sure that the amount of money to be paid is smaller than the current balance x, the procedure for the divisional use of electronic cash is far simpler than the procedure disclosed in the U.S. Pat. No. 5,224,162 and the amount of communication therefor is also significantly small.

Another feature of the present invention resides in that the data $(X,K,N_U)$ registered by the issuer 100 in the inspection data base 105 is erased when all the corresponding electronic cash is used up to the face value X. Hence, subsequent overspending of the electronic cash is found out at once since the data $(X,K,N_U)$ of the electronic cash sent from the shop 400 to the issuer 100 for settlement is already erased from the data base 105.

Additionally, what is characteristic of this method is that since the data $(X,K,N_U)$ registered in the data base 105 for inspection is erased at the time when all the electronic cash is spent or its overspending is discovered, the registered data $(X,K,N_U)$ held in the data base 105 is limited only to those effective at that point in time. Accordingly, if the total amount of electronic cash issued remains constant to some extent, the amount of registered data to be held in the inspection data base 105 remains substantially unchanged and does not accumulate. In contrast to this, according to the conventional electronic cash system, every bank needs to keep lists of overspent electronic cash and spent electronic cash (that has a possibility for overspending in future) under surveillance; hence, the amount of data held under surveillance accumulates with an increase in the amount of electronic cash issued.

Next, a description will be given, with reference to FIGS. 5 through 8, of the functional configurations of the apparatus 300, 200, 400 and 100. The parts corresponding to those shown in FIGS. 2 through 4 are identified by the same reference numerals and no description will be repeated in connection with them.

Figure 5:
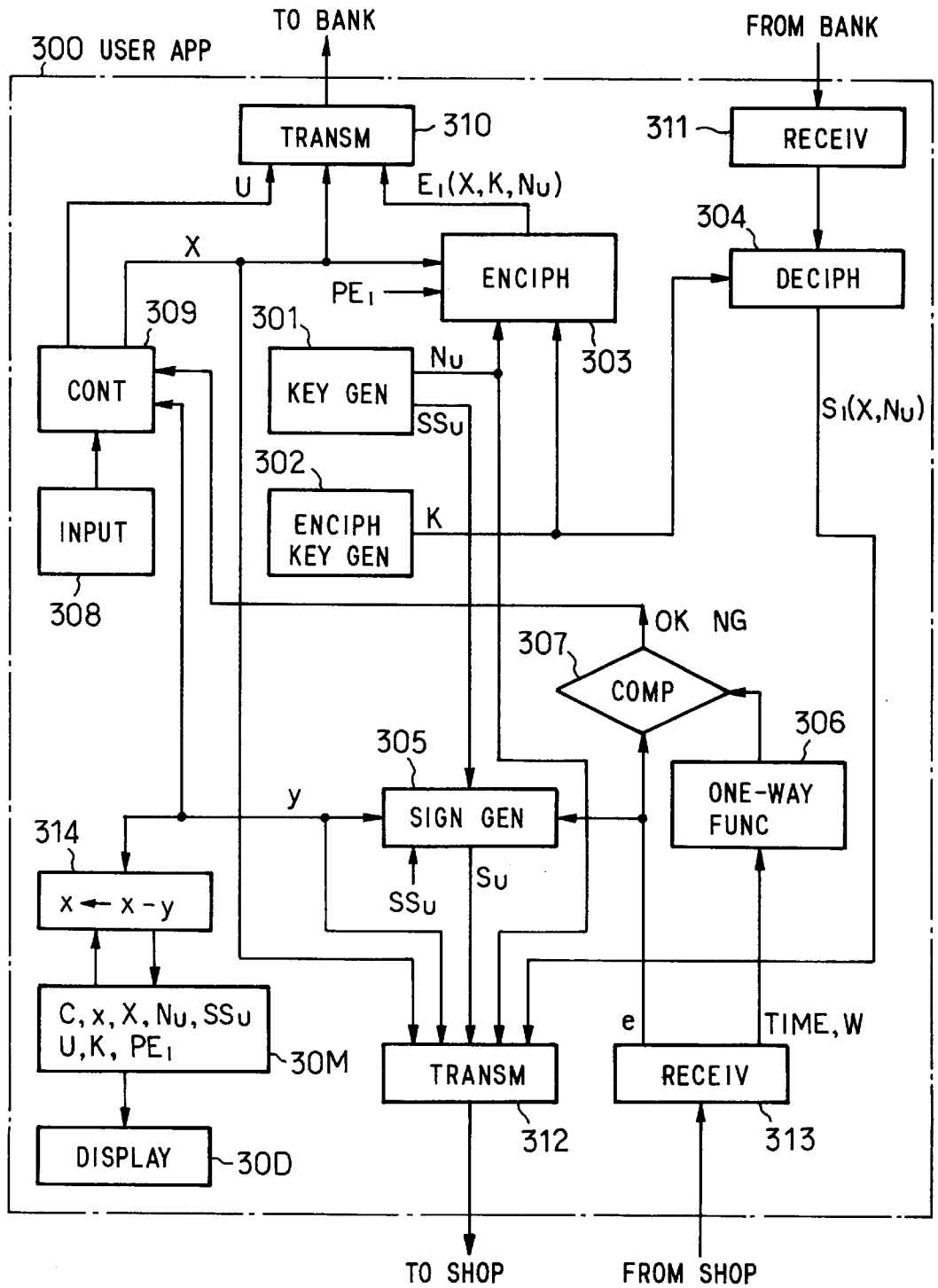
FIG. 5 is a block diagram illustrating an example of the functional configuration of the user apparatus according to the present invention.

FIG. 5 illustrates the user apparatus 300. The user 300 can input the amount of money X, the amount of payment y and the user identifier U into a control section 309 through an input section 308 such as a keyboard. When the user apparatus 300 is dedicated to the user, the user identifier U may also be prestored in the memory 30M in the control section 309. The amount of money X, the user identifier U and the enciphered electronic cash issuance request $E_I(X, K,N_U)$ are sent via a sending section 310 to the bank 200, whereas the enciphered information $E_K(S_I(X,N_U))$ from the issuer 100 via the bank 200 is received in a receiving section 311. The keys $N_U$, $SS_U$ and K generated in the key generating section and the cipher key generating section 302 are once written into the memory 30M and held therein. The control section 309 reads out the keys $N_U$, K and $SS_U$ from the memory 30M as required and uses them to operate the encipher section 303, the decipher section 304 and the signature generating section 305 at required points in time. The sending section 310 is also placed under the control of the control section 309 and the reception by the receiving section 311 is reported to the control section 309.

The one-way function calculating section 306 and the compare section 307 are also controlled by the control section 309 to start their operation. The control section 309 decides whether or not to take further steps for the payment of electronic cash according to the result of comparison in the compare section 307. The electronic cash $C=\{x,X,N_U, S_I(X,N_U)\}$, the user signature $S_U(e,y)$ and the amount of payment y are sent to the shop 400 via a sending section 312 under the control of the control section 309. The inquiry information e and the signals TIME and W from the shop 400 are received in a receiving section 313 and separated into individual information, and the reception is reported to the control section 309.

Figure 6:
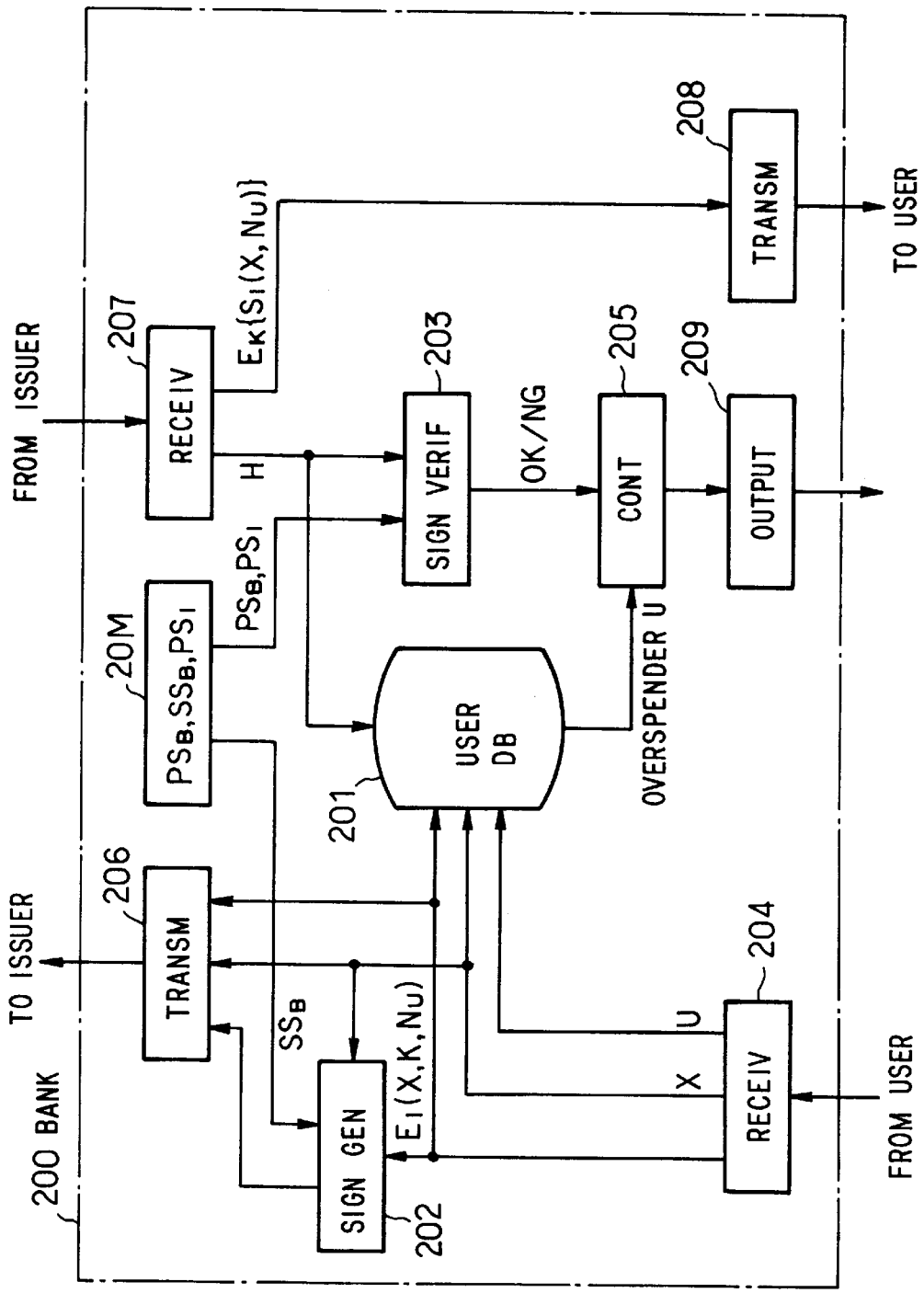
FIG. 6 is a block diagram illustrating an example of the functional configuration of the bank apparatus according to the present invention.

FIG. 6 is a block diagram illustrating the apparatus at the bank 200. In the memory 20M there are prestored the keys $SS_B$ and $PS_I$ that are used in the signature generating section 202 and the signature verification section 203. The information $\{U, X, E_I(X,K,N_U)\}$ sent from the user 300 is received in a receiving section 204 and separated into individual information and the reception of the information is reported to a control section 205. The control section 205 controls read/write and retrieval of the user data base 201 and controls the signature generating section 202 and the signature verification section 203 to start their operation. Under the control of the control section 205 the information $S_B(X,E_I(X,K,N_U))$, X and $E_I(X,K,N_U)$ are sent to the issuer 100 via a sending section 206.

The information from the issuer 100 is received in a receiving section 207, and when it is an enciphered signature $E_K(S_I(X,N_U))$ for the issuance of electronic cash, it is send to the user 300 via a sending section 208. The reception of information in the receiving section 207 is reported to the control section 205 and the transmission of information via the sending section 208 is placed under the control of the control section 205. When overspender specifying request information containing the communication data H is received in the receiving section 207, processing for specifying the overspender is carried out under the control of the control section 205, and when the overspender is specified, it is reported to the outside via an output section 209 to take the necessary steps.

Figure 7:
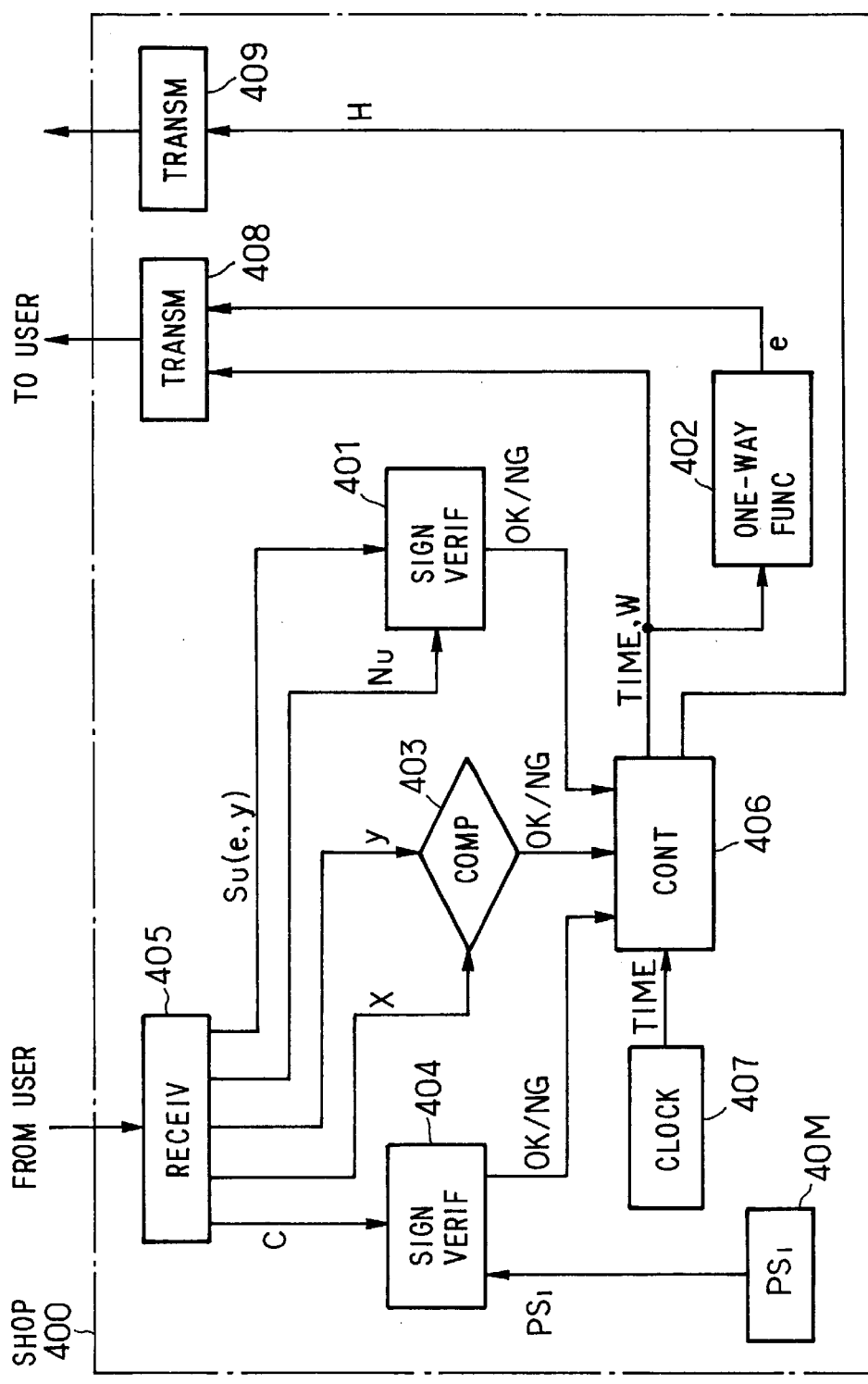
FIG. 7 is a block diagram illustrating an example of the functional configuration of the shop apparatus according to the present invention.

FIG. 7 is a block diagram illustrating the apparatus at the shop 400. In a memory 40M there is prestored the public key $PS_I$ that is used in the signature verification section 404 to verify the signature of the issuer 100. The information from the user 300 is received in a receiving section 405 and separated into individual information and the reception of the information is reported to a control section 406. The control section 406 effects operation start control of the signature verification sections 401 and 404, the compare section 403 and the one-way function calculating section 402 in response to the reception of the electronic cash C and the reception of the user signature $S_U(e,y)$. A clock 407 is provided, from which time information TIME is input into the control section 406. The information W dependent on the shop 400 is stored in the control section 406. The information e, TIME and W are sent to the user 300 via a sending section 408 under the control of the control section 406. The results of verification in the signature verification sections 401 and 404 and the result of comparison in the compare section 403 are input into the control section 406, which, based on these inputs, sends the communication data H as a request for settlement to the issuer 100 via a sending section 409.

Figure 8:
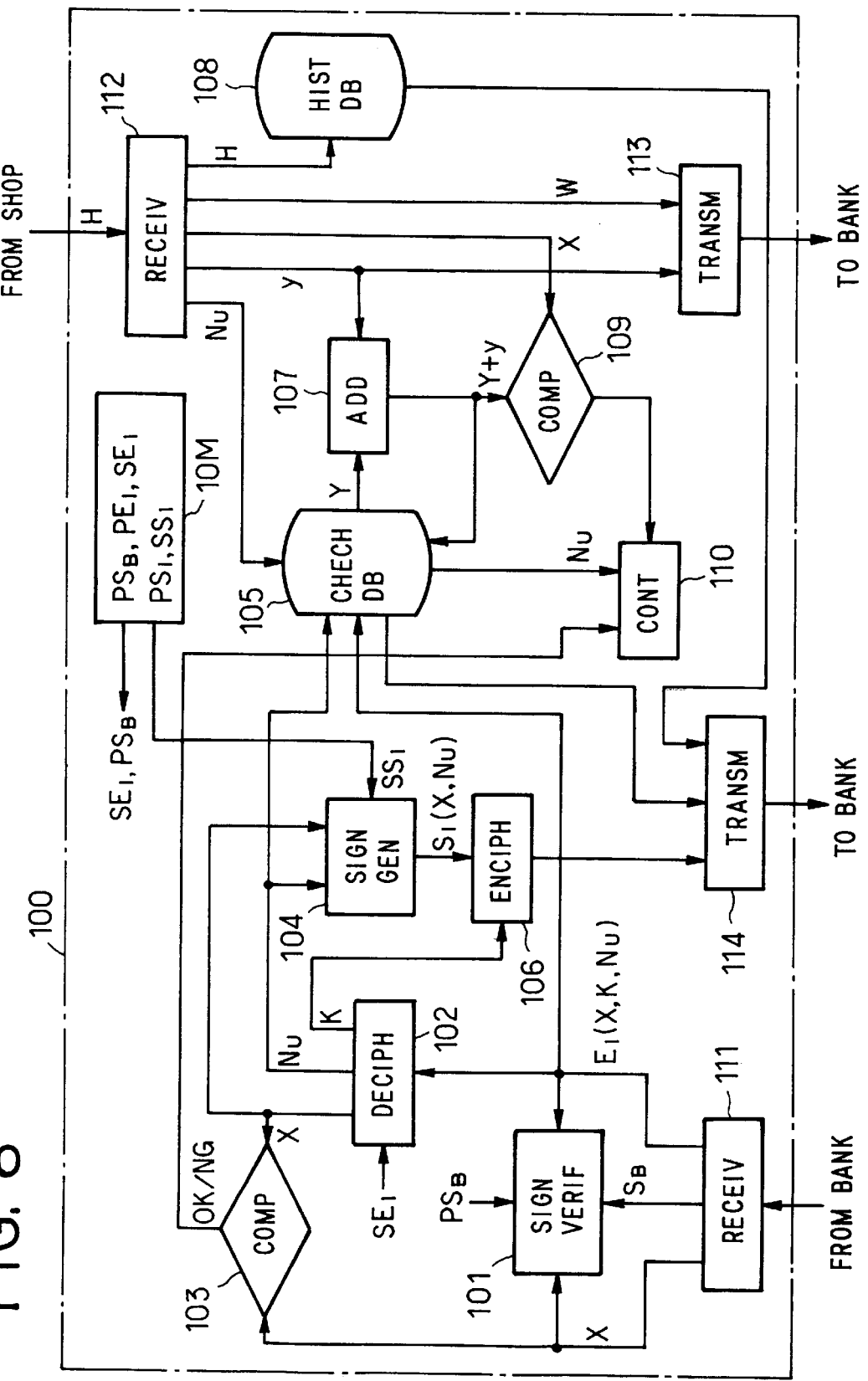
FIG. 8 is a block diagram illustrating an example of the functional configuration of the issuer apparatus according to the present invention.

FIG. 8 is a block diagram illustrating the apparatus at the issuer 100. In the memory 10M there are prestored the keys $PE_I$, $SE_I$, $PS_I$ and $SS_I$ generated in advance. A control section 110 effects operation start control of the signature verification section 101, the decipher section 102, the compare section 103, the signature generating section 104, the encipher section 106, the add section 107 and the compare section 109 and controls write, retrieval and read out operations of the inspection data base 105 and the history data base 108. The information $\{X, S_B, E_I(X,K,N_U)\}$ from the bank 200 is received in a receiving section 111 and separated into individual information and the reception of the information is reported to control section 110. The control section controls the respective sections to perform the processing. The information from the shop 400 is received in a receiving section 112 and separated into individual information and the processing is conducted under the control of the control section 110. When the request for settlement is approved as the result of the processing, the control section 110 sends via a sending section 113 the information y and W to the bank with which the shop 400 has its account, requesting it to transfer the amount of money y to the shop's account. The enciphered signature $E_K(S_I(X,N_U))$ for electronic cash and overspender specifying request information are sent via a sending section 114 to the bank 200 under the control of the control section 110.

Usually, the above-described apparatus 100, 200, 300 and 400 are each configured so that respective operations are mostly processed by one electronic computer, or formed by several DSPs (Digital Signal Processors); that is, each apparatus is not formed as one piece of hardware.

EFFECT OF THE INVENTION

As is the case with the Chaum et al. system, the present invention ensures user privacy and permits detection of overspending of electronic cash. Another advantage of the invention resides in that the amount of communication in the payment processing can be made smaller than in the Chaum et al. system. Besides, the electronic cash is divisible and the electronic cash issuer and the financial institution that manages users' accounts can be separated hierarchically.

For example, according to the Chaum et al. scheme, when the probability of success in overspending in the payment by electronic cash is $\frac{1}{2}^{30}$, processing needs to be performed 30 times, so that if the output size of the one-way function is assumed to be 128 bits, an amount of communication of at least $(3 \times 128 \times 39) = 11520$ bits is required.

According to the present invention, the sizes of the data y and e and the user signature therefor become the amount of communication in the payment processing. The total of the sizes of the data y and e (and TIME,W) is a maximum of about 200 bits. Assuming that the size of the signature is 1024 bits, the total is 1200 bits at the maximum. Thus, according to the present invention, the amount of communication that is needed for the payment processing can be reduced by approximately $\frac{1}{10}$ that in the past.

Moreover, the electronic cash issued can be divided and used repeatedly until the total sum of payments reaches the face value.

Besides, the electronic cash issuer and the financial institutions (banks) that manage users' bank accounts are separated hierarchically—this enables the issuer to keep a watch on the amount of electronic cash that is issued by and returned to each bank. Accordingly, the issuer is capable of preventing the amount of electronic cash circulating through every bank from exceeding the sum total predetermined by the bank.

It will be apparent that many modifications and variations may be effected without departing from the scope of the novel concepts of the present invention.

What is claimed is:

1. An electronic cash implementing method for an electronic cash system which is composed of an electronic cash issuer, a bank which manages account information of a user, a user who uses electronic cash for payment, and a shop which receives a payment by electronic cash, said method comprising:

step (1) wherein said electronic cash issuer opens an encipher function $E_1$ and a signature verification function $V_1$ to the public;

step (2) wherein said user sends to said bank user information U and a face value X for requesting said bank to withdraw an amount of money X from his bank account and issue electronic cash of said face value X, while at the same time said user generates a signature verification key $N_U$ for his signature and a cipher key K, then enciphers said signature verification key $N_U$ and said cipher key K to generate enciphered user information $E_I(X,K,N_U)$, and sends it to said bank;

step (3) wherein said bank withdraws said amount of money X from the user's bank account, and sends information $\{X, E_I(X,K,N_U)\}$ as an electronic cash issuance request to said electronic cash issuer, while at the same time said bank records in a user data base the user name U and said enciphered user information $E_I(X,K,N_U)$ in correspondence with each other;

step (4) wherein said electronic cash issuer uses a decipher function $D_I$ to decipher said enciphered user information $E_I(X,K,N_U)$ to obtain information $(X,K,N_U)$, generates information $n=g(N_U)$ containing said signature verification key $N_U$, signs said information n and said amount of money X to create an issuer signature $S_I(X,n)$, then registers said information n and $E_I(X,K,N_U)$ in an inspection data base in correspondence with each other, and calculates an enciphered issuer signature $E_K(S_I(X,n))$ obtained by enciphering said issuer signature $S_I(X,n)$ by said cipher key K, and sends said enciphered issuer signature $E_K(S_I(X,n))$ to said user;

step (5) wherein said user deciphers said enciphered issuer signature $E_K(S_I(X,n))$ by said key K into said issuer signature $S_I(X,n)$;

step (6) wherein said user sends, as electronic cash C of said face value X, information containing $\{N_U, X, S_I(X,n)\}$ to said shop for the payment thereto in an amount y;

step (7) wherein said shop verifies the validity of said electronic cash C and, if valid, receives the payment in said amount y;

step (8) wherein said shop sends to said electronic cash issuer all communication data H concerning the payment by said electronic cash and requests said issuer to settle accounts with said shop; and step (9) wherein said electronic cash issuer obtains, with said signature verification key $N_U$ in said communication data H, said information $n=g(N_U)$ containing said key $N_U$, makes a check to see if said information n is already registered in said inspection data base, verifies the validity of said electronic cash and, if valid, instructs said bank to transfer the amount of payment y to a bank account of said shop.

2. An electronic cash implementing method for an electronic cash system which is composed of an electronic cash issuer, a bank which manages account information of a user, a user who uses electronic cash for payment, and a shop which receives a payment by electronic cash, said method comprising:

step (1) wherein said electronic cash issuer opens an encipher function $E_1$ and a signature verification function $V_1$ to the public;

step (2) wherein said user sends to said bank user information U and a face value x for requesting said bank to withdraw an amount of money X from his bank account and issue electronic cash of said face value X, while at the same time said user generates a cipher key K, then enciphers said amount of money X and said cipher key K to generate enciphered user information $E_I(X,K)$, and sends it to said bank;

step (3) wherein said bank withdraws said amount of money X from the user's bank account, and sends information $\{X, E_I(X,K)\}$ as an electronic cash issuance request to said electronic cash issuer, while at the same time said bank records in a user data base the user name U and said enciphered user information $E_I(X,K)$ in correspondence with each other;

step (4) wherein said electronic cash issuer responds to said electronic cash issuance request to generate a signature verification key $N_U$ for said user and information $n=g(N_U)$ containing said signature verification key $N_U$, registers said information n and $E_I(X,K)$ in an inspection data base in correspondence with each other, deciphers said received information $E_I(X,K)$ by a decipher function $D_I$ to obtain information $(X,K)$, creates an issuer signature $S_I(X,n)$, then calculates an enciphered issuer signature $E_K(N_U, S_I(X,n))$ obtained by enciphering said issuer signature $S_I(X,n)$ by said cipher key K, and sends said enciphered issuer signature $E_K(N_U, S_I(X,n))$ to said user;

step (5) wherein said user deciphers said enciphered issuer signature $E_K(N_U, S_I(X,n))$ by said key K into said issuer signature $S_I(X,n)$;

step (6) wherein said user sends, as electronic cash C of said face value X, information containing $\{N_U, X, S_I(X,n)\}$ to said shop for the payment thereto in an amount y;

step (7) wherein said shop verifies the validity of said electronic cash C by said signature verification key $N_U$ and, if valid, receives the payment in said amount y;

step (8) wherein said shop sends to said electronic cash issuer all communication data H concerning the payment by said electronic cash and requests said issuer to settle accounts with said shop; and step (9) wherein said electronic cash issuer obtains, with said signature verification key $N_U$ in said communication data H, said information $n=g(N_U)$, makes a check to see if said information n is already registered in said inspection data base, verifies the validity of said electronic cash and, if valid, instructs said bank to transfer the amount of payment y to a bank account of said shop.

3. The method of claim 1 or 2, wherein said step (3) is a step wherein said bank attaches a signature $S_B(X, E_I)$ to information $(X, E_I)$ sent from said user and sends it to said issuer together with said information $(X, E_I)$, and said step (4) is a step wherein said issuer verifies the validity of said signature $S_B(X, E_I)$ and, if valid, deciphers said information by said decipher function $D_I$, compares said deciphered amount of money X and the amount of money X sent from said bank and, if they match, generates said issuer signature $S_I$.

4. The method of claim 1 or 2, wherein said step (7) comprises:

step (7a) wherein said shop receives from said user said electronic cash C containing a balance x, then generates arbitrary information e and sends it to said user;

step (7b) wherein said user calculates a signature $S_U(e,y)$ of said user for said information e sent from said shop and said amount of payment y and sends said signature $S_U(e,y)$ to said shop together with said amount of payment y; and step (7c) wherein said shop verifies the validity of said issuer signature $S_I(X,n)$ by a public key $PS_I$ for the verification of said issuer signature and a signature verification function $V_I$, further verifies the validity of said user signature $S_U(e,y)$ by said user signature verification key $N_U$ contained in said electronic cash C received from said user, while at the same time said shop verifies if said balance x satisfies a condition $y \leq x$, and, if the results of all the verifications are valid, approves the payment by said electronic cash C of said amount y.

5. The method of claim 4, wherein said step (7) is a step: wherein said shop verifies the validity of said issuer signature $S_I(X,n)$ contained in said electronic cash C by using said public signature verification key $PS_I$ and, if valid, calculates a one-way function $f(TIME, W)$ using time information TIME and shop information W as variables, then generates said information e and sends it to said user together with said time information TIME and said shop information W as well; and wherein said user calculates a one-way function $e=f(TIME, W)$ using said time information TIME and said shop information W as variables, then compares said one-way function e with said information e sent from said shop and, if they match, sends said information $\{y, S_U(e,y)\}$ to said shop.

6. The method of claim 4, wherein said step (9) comprises:

step (9a) wherein said issuer makes a check to see if said information n derived from said communication data received from said shop is already registered in said inspection data base;

step (9b) wherein if said information n is registered, said issuer updates with a value Y+y the total amount of money used Y corresponding to said information n, step (9c) wherein said issuer makes a check to see if said value Y+y is smaller than said face value X and, if so, instructs said bank to transfer said amount of money y to a bank account of said shop;

step (9d) wherein if Y+y=X, said issuer erases said information n from said inspection data base; and step (9e) wherein if Y+y>X, said issuer decides that said user overspent, and sends said information $E_I$ to said bank to specify the mane of overspender from information stored in a user data base of said bank.

7. The method of claim 1 or 2, wherein said information $n=g(N_U)$ is $n=N_U$.

8. The method of claim 1 or 2, wherein said step (7) includes a step wherein when said electronic cash is verified to be valid by said shop, said user updates the balance x of said electronic cash with a value x−y.

9. The method of claim 1 or 2, wherein said step (4) includes a step wherein said issuer sends said enciphered issuer signature $E_K$ to said user via said bank.

10. A user apparatus for an electronic cash system which is composed of an electronic cash issuer, a bank which manages account information of a user, a user who uses electronic cash for payment, and a shop which receives a payment by electronic cash, said user apparatus comprising:

input means for inputting an amount of money X and an amount of payment y;

cipher key generating means for generating a cipher key K; Key generating means for generating a signature generating key $SS_U$ and a signature verification key $N_U$;

encipher means for enciphering said amount of money X and said keys K and $N_U$ by a public cipher function $E_I$ of said electronic cash issuer to obtain the information $E_I(X,K,N_U)$;

means for sending to said bank said enciphered information $E_I(X,K,N_U)$, user information U and a message requesting said bank to withdraw said amount of money X from a bank account of said user;

decipher means for deciphering an enciphered issuer signature from said bank by said key K to obtain a signature $S_I(X,N_U)$ of said issuer;

signature generating means for generating a user signature $S_U(e,y)$ by said user signature generating key $SS_U$ for information e in information received from said shop and said amount of payment y; and means for sending said amount of money X, said amount of payment y, said signature verification key $N_U$ and said signatures $S_I(X,N_U)$ and $S_U(e,y)$ to said shop.

11. A bank apparatus for an electronic cash system which is composed of an electronic cash issuer, a bank which manages account information of a user, a user who uses electronic cash for payment, and a shop which receives a payment by electronic cash, said bank apparatus comprising:

means for receiving from said user enciphered information $E_I(X,K,N_U)$, user information U and a request for issuance of electronic cash of a face value X;

a user data base for storing said enciphered information $E_I(X,K,N_U)$ and said user information U in correspondence with each other;

means for attaching a bank signature $S_B$ to said enciphered information $E_I(X,K,N_U)$ and said amount of money X to obtain information $S_B(X,E_I(X,K,N_U))$ and for sending it to said issuer together with said amount of money X and said enciphered information $E_I(X,K,N_U)$;

means for sending to said user said enciphered issuer signature $E_K$ received from said issuer; and means for retrieving from said user data base said user information U corresponding to said enciphered user information $E_I(X,K,N_U)$ received together with a retrieval request from said electronic cash issuer.

12. An electronic cash issuer apparatus for an electronic cash system which is composed of an electronic cash issuer, a bank which manages account information of a user, a user who uses electronic cash for payment, and a shop which receives a payment by electronic cash, said cash issuer apparatus comprising:

decipher means for deciphering enciphered information $E_I(X,K,N_U)$ from the bank by a secret key $SE_I$ of a public key cryptosystem to obtain an amount of money X, user cipher key K and a user signature verification key $N_U$;

an inspection database for registering said user signature verification key $N_U$, said enciphered information $E_I(X,K,N_U)$ and the total amount of money paid so far Y as a set;

signature generating means for generating an issuer signature $S_I(X,N_U)$ for said amount of money X and said user signature verification key $N_U$;

encipher means for enciphering said issuer signature $S_I(X,N_U)$ by using said user cipher key K as a key therefor;

means which receives form said shop communication information H concerning payment by electronic cash, reads out of said inspection database said total amount of money used Y corresponding to said user signature verification key $N_U$, then adds said total amount of money paid so far Y with an amount of payment y, and updates said total amount of money Y;

means which makes a check to see if said updated total amount of money Y is smaller than said amount of money X, and if so, instructs said bank to transfer said amount of payment y to a bank account of shop information W contained in said received information H;

a history database for recording therein said received information H; and means which, when said updated total amount of money Y is equal to or larger than said amount of money X, erases from said inspection database the record corresponding to said user signature verification key $N_U$ and, when said updated total amount of money Y is larger than said total amount of money Y, reads out of said inspection database said enciphered information $E_I(X,K,N_U)$ corresponding to said verification key $N_U$ and sends said read-out information $E_I(X,K,N_U)$ to said bank so as to trace an abuser or overspender.

13. A shop apparatus for an electronic cash system which is composed of an electronic cash issuer, a bank which managers account information of a user, a user who uses electronic cash for payment, and a shop which receives a payment by electronic cash, said shop apparatus comprising:

means for receiving electronic cash C, the amount of payment y and a user signature $S_U(e,y)$ from said user;

issuer signature verifying means for verifying the validity of an issuer signature $S_I(X,N_U)$ in said electronic cash C received from the user;

user signature verifying means for verifying the validity of said received user signature by using said received user signature verification key $N_U$;

means for making a check to see if said received amount of payment y is smaller than the amount of money X in said received electronic cash C;

means for generating information e using shop information W as a variable and for sending said information e to said user; and means for sending, to said issuer, communication data between said user and said shop concerning the payment by said electronic cash.

* * * * *